FREQUENCY MODULATED MULTIVIBRATOR

Filed Sept. 22, 1959 3 Sheets-Sheet 1

INVENTOR
Walter T. Matzen
BY Stevens, Davis, Miller & Mosher
ATTORNEYS

INVENTOR
Walter T. Matzen
BY Stevens, Davis, Miller & Mosher
ATTORNEYS

Oct. 30, 1962 W. T. MATZEN 3,061,800

FREQUENCY MODULATED MULTIVIBRATOR

Filed Sept. 22, 1959 3 Sheets-Sheet 3

INVENTOR

Walter T. Matzen

BY Stevens, Davis, Miller & Mosher

ATTORNEYS

United States Patent Office 3,061,800
Patented Oct. 30, 1962

3,061,800

FREQUENCY MODULATED MULTIVIBRATOR

Walter T. Matzen, Richardson, Tex., assignor to Texas Instruments Incorporated, Dallas, Tex., a corporation of Delaware Filed Sept. 22, 1959, Ser. No. 841,552
3 Claims. (Cl. 332—14)

This invention relates to multivibrators and more particularly to an improved transistorized multivibrator of the free-running type, which changes in operating frequency according to a linear function of the voltage of an input signal.

Figure 1:
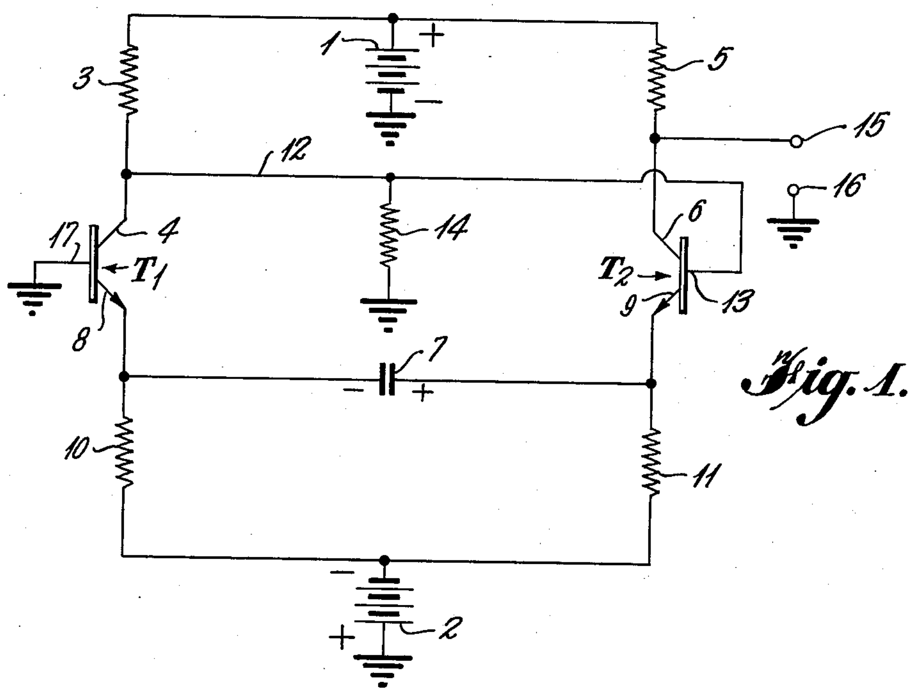

Frequency-modulated multivibrators are old in the art, illustrative of which is that shown in FIGURE 1 of an article, entitled "Development of a Transistorized Voltage Control Oscillator," by Warren E. Wilke and Wendell B. Sander, found at pages 86–97 of the 1958 Wescon Convention Record, Part 5, published by the Institute of Radio Engineers. Such frequency-modulated multivibrators have employed conventional multivibrator configurations characterized by symmetrical capacitor-resistor circuits interconnecting the two active switching elements (i.e., vacuum tubes or transistors). Although these frequency-modulated multivibrators have been known to operate satisfactorily in certain applications, they have exhibited one or more of the following characteristics which at times have rendered them unsuitable or prohibitively expensive. These characteristics include undesired change in output amplitude coincident with change in frequency; insufficient linearity in frequency change versus input voltage; dependence of frequency upon output load impedance; and the requirement that the output load impedance be relatively high. In addition, previously known frequency-modulated multivibrators have required the employment of a relatively large number of circuit elements, such as resistors and capacitors, thereby rendering them sufficiently expensive to preclude their utilization in certain applications.

Free-running multivibrators other than that to which reference is made above have also been proposed. One such multivibrator which comprises a minimum number of electrical components is that disclosed in FIGURE 14.24 (*b*) in the "Handbook of Semiconductor Electronics," edited by Lloyd P. Hunter, First edition (1956), published by McGraw-Hill Book Company, Inc. This multivibrator has not been adapted to frequency-modulated operation, however, since the principles which have underlain the adaptation of the first-mentioned multivibrator are not readily applicable thereto.

It is one general object of this invention to improve frequency-modulated multivibrators.

It is another object of this invention to reduce the number of accompanying components in such multivibrators to a minimum, thereby reducing cost and size.

It is yet another object of this invention to provide a frequency-modulated multivibrator in which the amplitude of the output signal does not change with frequency, in which a high degree of linearity in modulation is obtained, in which changes in output load impedance have negligible effect on frequency, and in which the output terminals may be short circuited or grounded to alternating voltage without interrupting multivibrator action.

Consequently, in accordance with one feature of the invention, in a free-running multivibrator having two active switching elements interconnected by a frequency-affecting capacitor which charges and discharges during a cycle of operation, current-accepting circuits are provided to accept discharge current from the capacitor at a rate which is substantially independent of the capacitor terminal voltage, thereby causing the capacitor to exhibit a linear discharge characteristic.

In accordance with yet another feature of the invention, circuit parameters are selected to cause the frequency-affecting capacitor to charge during a relatively small part of the charge-discharge cycle, thereby rendering the frequency of multivibrator action substantially linear as a function of the capacitor discharge time.

In accordance with still another feature of the invention, the current-accepting circuits are effective to vary the magnitude of accepted current linearly as a function of signal voltage applied to a control terminal thereof, thereby permitting linear control of the rate of capacitor discharge and attending substantially linear change in multivibrator operating frequency.

In accordance with still a further feature of the invention, the control of capacitor discharge current independent of capacitor terminal voltage is advantageously exploited to provide changes in multivibrator frequency without changing the peak charging voltage of the frequency-affecting capacitor, thereby rendering the negative peak voltage output from the multivibrator effectively independent of operating frequency.

In accordance with still a further feature of the invention, an output terminal is advantageously connected to an electrode of one of the two active multivibrator elements in such manner that the output terminal may be grounded to alternating voltage or with proper bias may be grounded to D.C. without interrupting or otherwise affecting multivibrator action.

Figure 3:
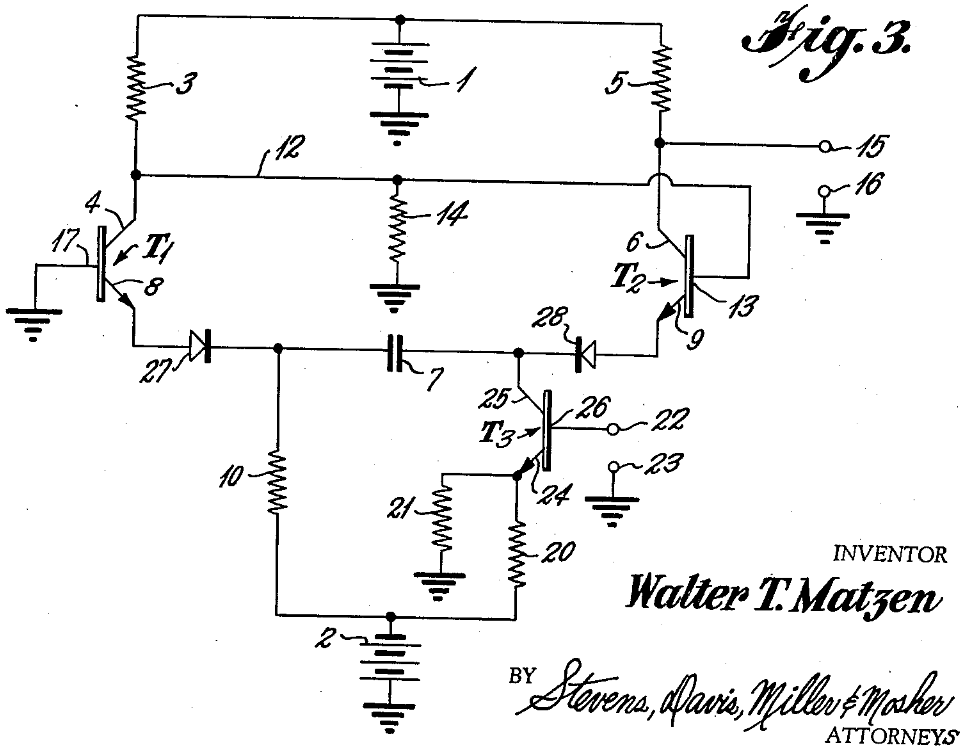

These and other objects and features of the invention will be apparent from the following detailed description, by way of example, with reference to the drawing in which:

FIGURE 1 is a schematic diagram of a basic emitter-coupled, free-running multivibrator illustrative of the prior art;

FIGURES 2*a*–2*f* are diagrams of various voltage and current waveforms which depict certain cyclic phenomena occurring within the circuits of FIGURE 1;

FIGURE 3 is a schematic diagram disclosing an embodiment of this invention; and

Figure 4A:
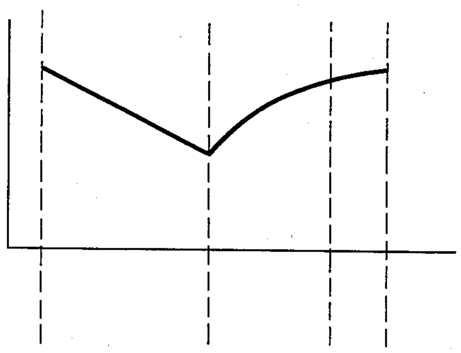
Figure 4B:
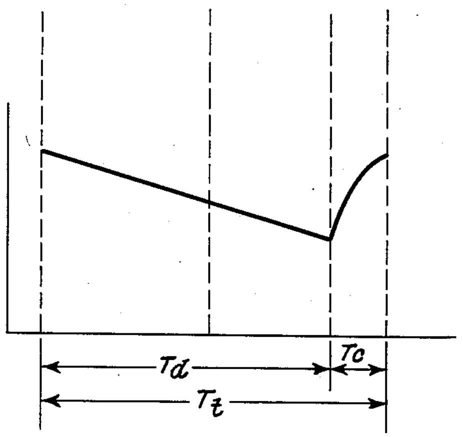
Figure 4C:
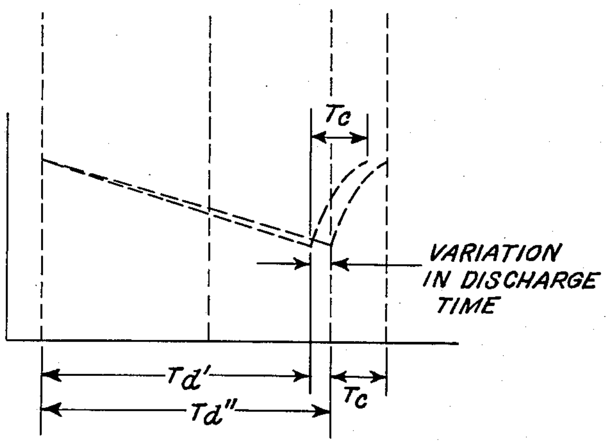

FIGURES 4*a*–4*c* are diagrams depicting charge and discharge currents and voltages of capacitor 7 within the circuits of FIGURE 3.

Now turning to the drawing, and more particularly to FIGURE 1 thereof, it will be observed that schematically portrayed therein are two transistors T1 and T2, two sources of operating potential 1 and 2, collector load resistor 3 serially interconnecting the collector 4 of transistor T1 with potential source 1, collector load resistor 5 interconnecting collector 6 of transistor T2 with potential source 1, capacitor 7 serially interconnecting emitter 8 of transistor T1 with emitter 9 of transistor T2, emitter load resistor 10 serially interconnecting emitter 8 of transistor T1 with potential source 2, emitter load resistor 11 serially interconnecting emitter 9 of transistor T2 with potential source 2, a feedback path 12 connecting the collector 4 of transistor T1 with the base 13 of transistor T2, resistor 14 which in series with resistor 3 forms a voltage divider to limit the maximum excursion of positive potential at the base 13 of transistor T2 to a value less than that appearing at collector 6, and output terminals 15 and 16.

In operation, the two transistors T1 and T2 alternately conduct, the reasons therefor being apparent from an analysis of one complete cycle. Since once the sources of potential are connected to the circuits, operation begins and alternate switching continues indefinitely, a description of operation may begin at any point in the cycle. However, for purposes of simplicity in explanation, the following description will begin at a point in the cycle immediately after transistor T1 has been switched from a nonconducting to a conducting state.

As will be apparent to one familiar with transistor circuitry, in order for transistor T1 to conduct, it will be necessary that its emitter-base diode be forward biased. Consequently, the emitter 8 will be slightly negative with respect to the base 17, a condition that will persist as long as transistor T1 is in its conducting state.

Since transistor T1 is conducting, current flows from battery 1 through resistor 3, collector 4, and emitter 8 to the junction of capacitor 7 and resistor 10. There, the current divides, a portion flowing to capacitor 7 to discharge it (capacitor 7 having been charged oppositely), and the remainder flowing via resistor 10 to negative battery 2. The current flowing to capacitor 7 produces a counterpart current which flows through resistor 11 to the negative battery 2. Thus, a series parallel circuit is formed between emitter 8 of transistor T1 and negative battery 2. This series parallel circuit consists of resistor 10 which is connected in parallel with the series combination of capacitor 7 and resistor 11. As will now be apparent, current flowing in this series parallel circuit will vary exponentially with time. At first, it will be rather high because the charge impressed upon capacitor 7 will tend to aid the flow of current from source 2 in the heretofore-traced circuit. Consequently, the voltage drop across resistor 3 will be substantial and the voltage appearing at the collector 4 of transistor T1 (and via loop 12 at the base 13 of transistor T2) will be correspondingly low. However, as capacitor 7 discharges, its terminal voltage decreases and the discharge current therefrom follows an exponential decay pattern which results in a corresponding exponential rise in the voltage impressed upon the collector 4 of transistor T1 and correspondingly upon the base 13 of transistor T2.

While the voltage at the base 13 of transistor T2 is rising for the reasons given above, the heretofore-mentioned decrease in capacitor discharge current results in a lowering of the potential at the emitter 9 of the transistor T2. This can be seen from an examination of the voltage drop across resistor 11, a voltage drop that exists at this point in the cycle entirely from current flowing in capacitor 7; and since the current in capacitor 7 is exponentially decreasing, the voltage drop across resistor 11 correspondingly decreases and the potential at emitter 9 moves more closely to the voltage of negative source 2.

Both of the above changes in voltage tend toward switching transistor T2 to its conducting state. Thus, since for transistor T2 to conduct, it is necessary that its emitter reside at a potential slightly negative with respect to its base, and since as capacitor 7 discharges emitter 9 becomes more negative and base 13 more positive, it will be seen that if such changes continue, a point will be reached ultimately at which transistor T2 will be switched to its conducting state.

Figures 2A, 2B, 2C, 2D, 2E, 2F:
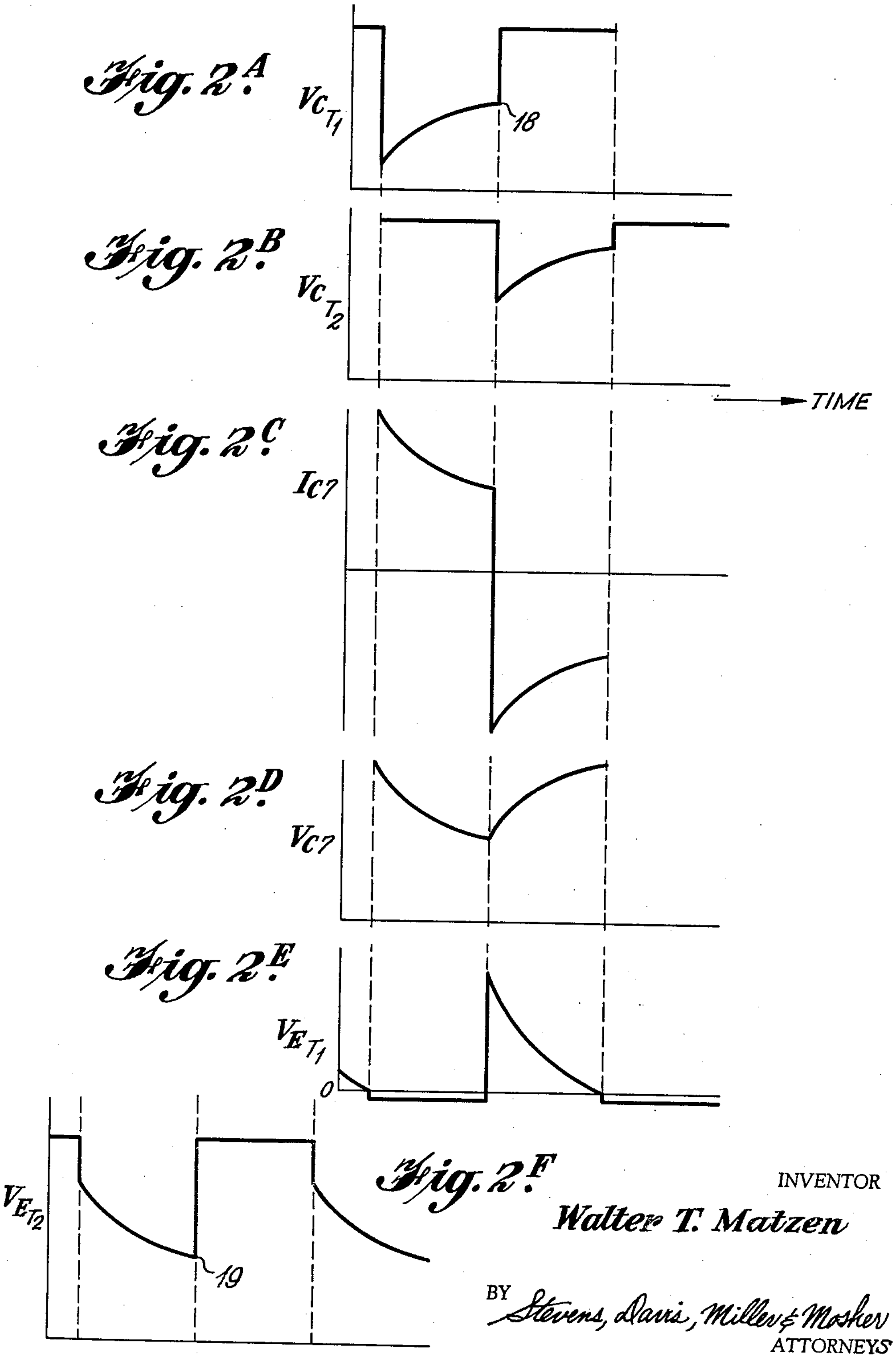

The circuit characteristics thus far described may be readily observed from a reference to the voltage waveforms of FIGURE 2. There, FIGURE 2*a* graphically shows the voltage which appears at the collector of transistor T1, FIGURE 2*b* the voltage appearing at the collector of transistor T2, FIGURE 2*c* the current flowing into and out of capacitor 7, FIGURE 2*d* the voltage across the terminals of capacitor C7, FIGURE 2*e* the voltage appearing at the emitter of transistor T1, and FIGURE 2*f* the voltage appearing at the emitter of transistor T2.

From an inspection of FIGURES 2*a* and 2*f*, it will be seen that at the moment of switching, the voltage at the collector of transistor T1 has risen to point 18 and the voltage at the emitter of transistor T2 has dropped to point 19 which is slightly less positive, thereby forward biasing the T2 emitter diode.

As transistor T2 begins to conduct, the voltage drops in the heretofore-mentioned series parallel circuit are substantially altered. Thus, current previously flowing from the emitter of transistor T1 to the left-hand terminal of capacitor 7 reverses direction, for the positive potential upon emitter 9 less the potential existing across the terminals of capacitor 7 tends to be higher than the voltage existing at the emitter 8 of transistor T1.

Coincident with the reversal of current flow in capacitor 7, an abrupt change in the voltage drop developed across resistor 3 takes place. Thus, whereas when current was flowing from the emitter 8 of transistor T1 into capacitor 7, such current contributed to the voltage drop across resistor 3, thereby resulting in a lowered potential existing at the collector 4 of transistor T1, as soon as the direction of current reverses in capacitor 7, the component of current attributable to flow from emitter 8 to capacitor 7 disappears, and the voltage drop across resistor 3 decreases correspondingly thereby raising the level of potential existing at the collector 4. This rise in potential at collector 4 is transmitted over loop connection 12 to the base of 13 of transistor T2 where it accentuates the forward biasing of the emitter diode of transistor T2 and consequent conduction therethrough. The potential at emitter 9 follows that of the base 13 closely when the transistor is forward biased and, therefore, the potential upon emitter 9 is raised correspondingly.

Since the emitter 9 of transistor T2 is at a relatively high positive potential, and since capacitor 7 is in a relatively discharged condition, the potential instantaneously resident upon the emitter 8 of transistor T1 is a relatively high positive value which is equal to the potential resident upon emitter 9 of transistor T2 less the relatively low voltage appearing across the terminals of capacitor 7. As a consequence thereof, the emitter diode of transistor T1 is effectively back-biased, and the transistor remains in a cut-off condition until sufficient charge is built up upon capacitor 7 to raise the terminal voltage thereof to a value sufficient, when subtracted from the positive voltage resident at emitter 9 of transistor T2, to produce a voltage at emitter 8 of transistor T1 sufficiently low to forward bias the emitter diode. At such time as this occurs, transistor T1 again begins to conduct thereby lowering the voltage at the collector thereof to a value sufficient, when conveyed by loop 12 to the base 13 of transistor T2, to cut off the emitter diode of transistor T2 and stop the conduction of current therethrough.

The voltage and current relationships to which reference is made above may be discerned from reference to FIGURES 2*a*, 2*c*, 2*d*, 2*e*, and 2f wherein the graphic representations of the several voltages and currents are deemed self-explanatory.

It will now be apparent that the circuits of FIGURE 1 define a free-running multivibrator in which the transistors T1 and T2 alternately conduct under the influence of charging and discharging current through capacitor 7 and the associated resistors. It will also be apparent that the charging and discharging currents of capacitor 7, together with the voltages developed across the various circuit resistors, are non-linear, i.e., they follow an exponential form. As a consequence, changes in voltages applied to the various circuit elements would perhaps produce a change in frequency of operation, but would control or affect such change non-linearly. In addition, such change in voltage would result in a change in output amplitude, thereby introducing amplitude modulation.

Now turning to FIGURE 3, it will be observed that there is therein shown in schematic form a multivibrator circuit somewhat similar to that of FIGURE 1, but having a pair of diodes 27 and 28 and a unique discharging circuit for capacitor 7 whereby the discharge current therefrom is received at a constant (rather than exponential) rate. The diodes 27 and 28 are included to protect the emitter-base junctions of transistors T1 and T2 from excessive reverse voltages. The unique circuits, which comprise transistor T3, resistor 20, resistor 21, and voltage control input terminals 22 and 23, operate in cooperative association with the remaining circuit elements of the multivibrator to cause the multivibrator to exhibit a substantially linear change in frequency as a function of input voltage at terminals 22 and 23. This is accomplished in the following manner.

First, considering only transistor T3, resistors 20 and 21, potential source 2, and terminals 22 and 23, operation of transistor T3 as a source of constant current can be understood when it is observed that the emitter potential thereof will vary as a function of current therethrough because of a consequent change in voltage developed across the divider network comprising resistors 20 and 21.

With a fixed potential applied between terminals 22 and 23, and with a positive potential connected to collector 25, the potential at emitter 24 will tend to stabilize at a level just slightly negative with respect to base 26. This is true because a slight variation in base-to-emitter potential results in a wide variation in emitter and collector current, and the voltage at emitter 24 will rest at a value which results in the passage of that value of current required to develop the necessary voltages across divider resistors 20—21. As a result of the wide variation of emitter current as a function of a tiny change in base-to-emitter potential, the current flowing from collector to emitter is substantially constant over a wide range of collector potentials (with the base potential constant), only a tiny change in current being needed to effect the minute voltage changes at the emitter of transistor T3.

Since the collector 25 of transistor T3 is connected to the right-hand terminal of capacitor 7, it will be apparent that the discharge current therefrom will flow through transistor T3 and that if the voltage upon terminal 22 of transistor T3 is held constant, such discharge current will flow at a substantially constant rate irrespective of the change in potential at the right-hand terminal of capacitor 7 as it discharges. Of course, the rate at which the "constant" discharge current flows can be changed by changing the base potential, and such in fact occurs when the circuits are employed.

Now considering the operation of the circuits of FIGURE 3, it will be observed that such operation is substantially identical to the operation of the circuits of FIGURE 1 during that part of the cycle when capacitor 7 is charging. Thus, when transistor T2 is conducting and capacitor 7 is being charged, the circuits of transistor T3 operate as a fixed impedance because the voltage appearing at the right-hand terminal of capacitor 7 remains substantially constant. Consequently, transistor T3 acts in a manner similar to that of resistor 11 in FIGURE 1, and capacitor 7 charges exponentially in the manner heretofore explained. In this connection, it may be helpful to recall that during the charging cycle the voltage appearing at emitter 9 of transistor T2 is slightly negative with respect to the potential existing at the base 13, and these two potentials remain substantially constant so long as transistor T2 is conducting.

As explained in connection with the circuits of FIGURE 1, capacitor 7 charges until the voltage developed across its terminals increases to a point at which the voltage appearing at emitter 8 of transistor T1 becomes slightly negative with respect to its associated base 17. At such time as this occurs, transistor T1 begins to conduct and, in the manner described above, cuts off transistor T2. Current now begins to discharge from capacitor 7 and flows at a linear rate through transistor T3. Since the voltage at the terminals of the capacitor is a linear function of the charge impressed thereupon, since the charge on a capacitor is equal to the integral of the product of current and the differential of time, and since the discharge current of capacitor 7 is linear, it naturally follows that the voltage drop at the terminals of capacitor 7 coincident with its discharge will also be a linear function of time.

A further understanding of the advantages of the circuits of FIGURE 3 may be obtained from reference to the voltage waveforms of FIGURES 4*a*–4*c*. There, in FIGURE 4*a*, there is depicted a voltage waveform corresponding to the voltage waveform of FIGURE 2*d*; and it will be seen that in FIGURE 4*a* the capacitor discharge voltage decreases linearly as a function of time until it reaches the point at which switching occurs and charging begins. Such waveform, i.e., the waveform of FIGURE 4*a*, would be that produced by the circuits of FIGURE 3 if the magnitude of current received by transistor T3 were substantially equal to that which passes through its counterpart (resistor 11) of FIGURE 1. However, in order that a linear variation in the value of discharge current from capacitor 7 may result in a substantially linear change in frequency of cyclic operation, the values of current accepted by transistor T3 are made substantially less than that in resistor 10 in order that the discharge portion of the operative cycle may occupy the major portion of the cyclic period. Thus, in FIGURE 4*b*, the voltage waveforms at the terminals of capacitor 7 have been modified in the manner indicated, the slope of the capacitor discharge characteristic having been rendered less steep in order to extend the time $T_d$ during which the capacitor is discharging. It will also be seen that the time $T_c$ has been correspondingly reduced, thereby rendering the total time $T_t$ substantially identical to that heretofore exhibited.

Modifications within the circuits of FIGURE 3 to produce the asymmetry of the charging and discharging periods can be accomplished by reducing the value of resistor 10 from that which it exhibited in the circuits of FIGURE 1, and in addition by altering resistors 20 and 21 to values at which current passed through transistor T3 is of relatively small magnitude. Thus, that portion of the cycle devoted to charging the capacitor is lessened (because the charging current is greater), and that portion of the cycle devoted to discharging the capacitor is increased because the discharge current is substantially reduced. It will now be apparent that since the discharge period occupies the major part of an operative cycle, a minor variation of the discharge time will result in a corresponding change in the total cycle period. Thus, since the value of the "constant current" discharge is a substantially linear function of the potential impressed upon the base 26 of transistor T3 and since the cyclic period varies substantially inversely with this current, the change in frequency will be a substantially linear function of the change in voltage impressed upon terminals 22 and 23 of transistor T3 so long as the change is not great. Consequently, frequency modulation occurs in which a variation in voltage impressed upon terminals 22 and 23 results in a substantially linear change in the frequency or cyclic operation of the multivibrator.

While I have presented my invention in one illustrative embodiment thereof, it will be apparent to one skilled in the art that there are various modifications and adaptations which may be employed without departing from the spirit or scope thereof.

What is claimed is:

1. A multivibrator circuit having first and second transistors, each of said transistors including an electron emitting electrode, a reactive device having a first and second terminal wherein current flows from said reactive device in a first direction at a first time and in a second direction at a second time, said reactive device being coupled between said electrodes, the flow of current in both of said directions normally being inherently nonlinear with respect to time, a common voltage point, resistive means coupled to one terminal of said reactive device and said common voltage point for causing current to flow non-linearly from said reactive device when the current is flowing in said first direction and second means for causing current to flow linearly from said reactive device when said current is flowing in said second direction, said second means including a constant current device coupled between the second terminal of said reactive device and said common voltage point, said constant current device including means for regulating the value of said constant current, thereby controlling the rate of current flow from said reactive device, whereby the frequency of said multivibrator can be controlled.

2. A device as set forth in claim 1 further including a first unidirectional current conducting device coupled between one of said electrodes and its associated terminal, and a second unidirectional current conducting device coupled between the other of said electrodes and its associated terminal, said unidirectional current conducting devices being poled so that current will not flow from said reactive device to one of said electrodes.

3. A device as set forth in claim 1 wherein said reactive device is a capacitor.

References Cited in the file of this patent

UNITED STATES PATENTS

| | | |
|---|---|---|
| 2,564,687 | Guenther | Aug. 21, 1951 |
| 2,750,502 | Gray | June 12, 1956 |
| 2,894,215 | Toy | July 7, 1959 |
| 2,929,030 | Wier | Mar. 15, 1960 |